US012756672B2

(12) United States Patent
Fu et al.

(10) Patent No.: US 12,756,672 B2
(45) Date of Patent: Oct. 6, 2026

(54) METHOD, APPARATUS, DEVICE AND MEDIUM FOR PERFORMING RESOURCE SCHEDULE IN CLUSTER

(71) Applicant: Beijing Volcano Engine Technology Co., Ltd., Beijing (CN)

(72) Inventors: Chunhui Fu, Beijing (CN); Jiyuan Tang, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 50 days.

(21) Appl. No.: 18/820,099

(22) Filed: Aug. 29, 2024

(65) Prior Publication Data

US 2025/0080473 A1 Mar. 6, 2025

(30) Foreign Application Priority Data

Aug. 31, 2023 (CN) ......................... 202311120170.9

(51) Int. Cl.
*H04L 47/70* (2022.01)

(52) U.S. Cl.
CPC .................................... *H04L 47/70* (2013.01)

(58) Field of Classification Search
CPC ...... H04L 47/70; H04L 47/781; H04L 67/141
USPC .......................................................... 709/226
See application file for complete search history.

(56) References Cited

U.S. PATENT DOCUMENTS

| | | | | |
|---|---|---|---|---|
| 10,567,388 | B1 * | 2/2020 | Kruse | H04L 63/10 |
| 10,846,788 | B1 * | 11/2020 | Klein | H04L 47/83 |
| 2014/0365626 | A1 * | 12/2014 | Radhakrishnan | G06F 9/45558 709/222 |
| 2015/0163158 | A1 * | 6/2015 | Ryland | H04L 41/0894 709/225 |

(Continued)

FOREIGN PATENT DOCUMENTS

| | | |
|---|---|---|
| CN | 110120979 A | 8/2019 |
| CN | 111352717 A | 6/2020 |

(Continued)

OTHER PUBLICATIONS

Notification to Grant Patent Right for Invention for Chinese Patent Application No. 202311120170.9, mailed on Jul. 7, 2025, 7 pages.

*Primary Examiner* — Meng Vang
(74) *Attorney, Agent, or Firm* — Astute IP Law Group

(57) ABSTRACT

There are provided methods, apparatuses, devices, and media for performing resource schedule in a cluster. In a method, a network service instance is created for managing a network service of the resource instance. A network link is established for accessing the resource instance using a network address of the resource instance and a network port that is allocated to the resource instance. A network state in the network service instance is updated based on the network link. In response to detecting that the network state indicates that the network link has been established, the resource instance is launched to communicate with the launched resource instance via the network link. With example implementations of the present disclosure, there is provided an access manner that does not rely on dedicated capabilities with any particular cluster. In this way, resource instance access under multiple clusters is managed in a general and unified manner.

20 Claims, 6 Drawing Sheets

(56) References Cited

U.S. PATENT DOCUMENTS

| | | | | |
|---|---|---|---|---|
| 2016/0380833 | A1 * | 12/2016 | Zhu | H04L 67/56 709/223 |
| 2019/0007366 | A1 * | 1/2019 | Voegele | H04L 61/4511 |
| 2019/0294451 | A1 * | 9/2019 | Baig | G06F 9/5038 |
| 2020/0241903 | A1 * | 7/2020 | Wang | G06F 9/5077 |
| 2022/0103207 | A1 | 3/2022 | Miao | |
| 2023/0114504 | A1 * | 4/2023 | He | G06F 9/5083 718/105 |

FOREIGN PATENT DOCUMENTS

| | | | |
|---|---|---|---|
| CN | 111796905 | A | 10/2020 |
| CN | 112243036 | A | 1/2021 |
| CN | 113746887 | A | 12/2021 |
| CN | 115225482 | A | 10/2022 |
| CN | 116010111 | A | 4/2023 |
| CN | 116028163 | A | 4/2023 |

* cited by examiner

METHOD, APPARATUS, DEVICE AND MEDIUM FOR PERFORMING RESOURCE SCHEDULE IN CLUSTER

CROSS-REFERENCE TO RELATED APPLICATIONS

The present application claims priority to Chinese Patent Application No. 202311120170.9 filed on Aug. 31, 2023, and entitled "METHOD, APPARATUS, DEVICE AND MEDIUM FOR PERFORMING RESOURCE SCHEDULE IN CLUSTER", the entirety of which is incorporated herein by reference.

FIELD

Example implementations of the present disclosure generally relate to network management, and more particularly to methods, apparatuses, devices, and computer-readable storage media for performing resource schedule in a cluster.

BACKGROUND

With the development of network technologies, various clustering solutions have been proposed. The provider of each cluster may develop a respective cluster technology based on the general cluster architecture. Each cluster may provide a respective resource instance, and different functional units in an application may rely on resource instances in different clusters, so as to achieve the overall function of the application. However, resource instances in different clusters may have customized input/output interface access patterns, which results in applications having to access the resource instances in a manner that is customized by each cluster. At this time, it is difficult to access the resource instances in the cluster from the outside of the cluster in a unified manner, thereby causing difficulty in communication between the functional units in the application. At this point, it is desirable to access various resource instances in the cluster in a more convenient and efficient manner.

SUMMARY

In a first aspect of the present disclosure, a method for performing resource schedule in a cluster is provided. In the method, a network service instance is created for managing a network service of the resource instance. A network link is established for accessing the resource instance using a network address of the resource instance and a network port that is allocated to the resource instance. A network state in the network service instance is updated based on the network link. In response to detecting that the network state indicates that the network link has been established, the resource instance is launched to communicate with the launched resource instance via the network link.

In a second aspect of the present disclosure, an apparatus for performing resource schedule in a cluster is provided. The apparatus comprises: a creating module, configured for creating a network service instance for managing a network service of the resource instance; an establishing module, configured for establishing a network link for accessing the resource instance using a network address of the resource instance and a network port that is allocated to the resource instance; an updating module, configured for updating a network state in the network service instance based on the network link; and a launching module, configured for launching, in response to detecting that the network state indicates that the network link has been established, the resource instance to communicate with the launched resource instance via the network link.

In a third aspect of the present disclosure, an electronic device is provided. The electronic device comprises: at least one processing unit; and at least one memory, coupled to the at least one processing unit and storing instructions executed by the at least one processing unit, the instructions, when executed by the at least one processing unit, causing the electronic device to perform the method according to the first aspect of the present disclosure.

In a fourth aspect of the present disclosure, a computer-readable storage medium is provided, storing a computer program thereon, the computer program, when executed by a processor, causing the processor to implement the method according to the first aspect of the present disclosure.

It should be understood that what is described in this Summary is not intended to identify key features or essential features of the implementations of the present disclosure, nor is it intended to limit the scope of the present disclosure. Other features disclosed herein will become easily understandable through the following description.

BRIEF DESCRIPTION OF DRAWINGS

The above and other features, advantages, and aspects of respective implementations of the present disclosure will become more apparent from the following detailed description with reference to the accompanying drawings. The same or similar reference numerals represent the same or similar elements throughout the figures, where.

DETAILED DESCRIPTION

Figure 1:
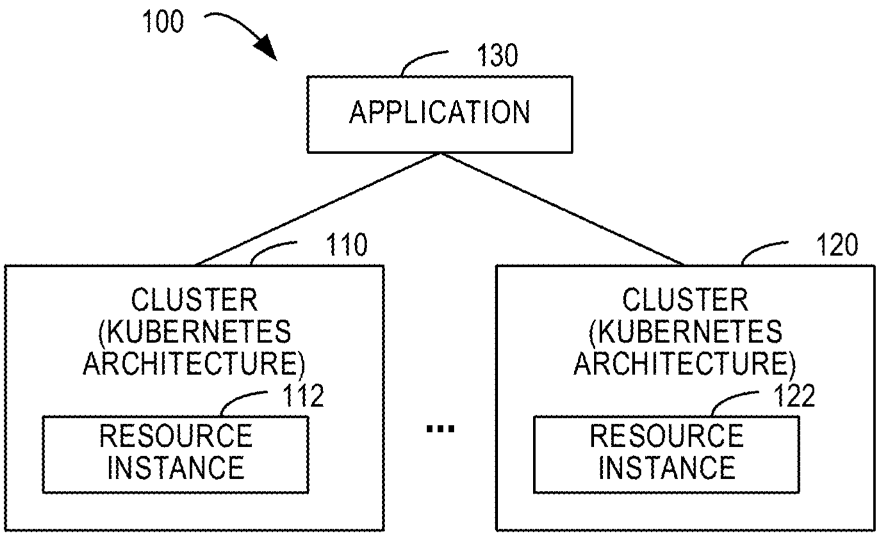
FIG. 1 illustrates a block diagram of a cluster environment according to an example implementation of the present disclosure.

The implementations of the present disclosure will be described in more detail with reference to the accompanying drawings, in which some implementations of the present disclosure have been illustrated. However, it should be understood that the present disclosure may be implemented in various manners, and thus should not be construed to be limited to implementations disclosed herein. On the contrary, those implementations are provided for the thorough and complete understanding of the present disclosure. It should be understood that the drawings and implementations of the present disclosure are only used for illustration, rather than limiting the protection scope of the present disclosure.

As used herein, the term "comprise" and its variants are to be read as open terms that mean "include, but is not limited to." The term "based on" is to be read as "based at least in part on." The term "one implementation" or "the implementation" is to be read as "at least one implementation." The term "some implementations" is to be read as "at least some implementations." Other definitions, explicit and implicit, might be further included below. As used herein, the term "model" may represent associations between respective data. For example, the above association may be obtained based on various technical solutions that are currently known and/or to be developed in future.

It is to be understood that the data involved in this technical solution (including but not limited to the data itself, data acquisition or use) should comply with the requirements of corresponding laws and regulations and relevant provisions.

It is to be understood that, before applying the technical solutions disclosed in respective embodiments of the present disclosure, the user should be informed of the type, scope of use, and use scenario of the personal information involved in the present disclosure in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the present disclosure.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

As used herein, the term "in response to" indicates a state in which a corresponding event occurs or a condition is satisfied. It is to be understood that the timing of the execution of a subsequent action that is performed in response to the event or condition is not necessarily strongly correlated to the time at which the event or condition occurs or is established. For example, in some cases, the subsequent action may be performed immediately upon occurrence of the event or upon satisfaction of the condition. In other cases, the subsequent action may be performed only after a period of time since the event occurs or the condition is established.

Example Environment

Referring to FIG. 1 for a brief of an application environment according to an example implementation of the present disclosure, and FIG. 1 illustrates a block diagram 100 of a cluster environment according to an example implementation of the present disclosure. As shown in FIG. 1, different providers may establish respective clusters 110, . . . , and 120 based on a base cluster architecture (e.g., Kubernetes architecture and/or various cluster architectures currently known and/or to be developed in the future). Each cluster may have a dedicated function developed over the infrastructure. For example, a cluster 110 may provide resource instance 112 and a cluster 120 may provide resource instance 122.

In an application 130 developed across clusters, different functional units may rely on resource instances in different clusters so as to achieve the overall function of the application. In this case, each resource instance needs to communicate with another requester (for example, another resource instance, another function module in the application 130, and the like) outside the cluster. However, resource instances in different clusters may have respective dedicated input/output interface access ways, which results in difficulties in accessing resource instances inside the cluster from the outside of the cluster in a unified manner, thereby causing difficulties in communication between individual functional units in the application.

With the widespread of cloud technologies of Kubernetes based PAAS (Platform As a Service) container, multi-cloud polymorphic scenarios have become a conventional scenario for application development. Cross-cluster scheduling and deployment of applications in a multi-cloud polymorphic scenario have become a conventional manner, although each Kubernetes cluster network are interconnected, each backend resource instance (for example, Pod) corresponding to an application is located in a private environment of a cluster in which the application is located. In this case, when application service traffic management (also referred to as service mesh) is implemented and application traffic unified access is implemented through a native gateway of the cloud, there may be a case in which a backend resource instance cannot be accessed.

Technical solutions have been proposed for cross-cluster resource access. For example, cross-cluster resource access may be achieved based on the IP address of Pod in the cluster, however this technical solution is enormous in IP consumption, and a large number of network communications are required. Further, when underlying data of Pods in different clusters is accessed, there is a need to follow dedicated access patterns for individual clusters, which leads to difficulties in managing cross-cluster communications in a unified manner. In another example, cross-cluster communication may be implemented based on pre-configured host port technology. However, this technical solution requires the host port information to be configured in advance and the host port cannot be automatically allocated. At this time, cross-cluster traffic access of applications becomes an urgent problem to be solved, and it is desirable to access various resource instances in a cluster in a more convenient and efficient manner.

Summary of Cross-Cluster Resource Access

In order to at least partially remove drawbacks in the prior art, a method is provided for performing resource schedule in a cluster according to an example implementation of the present disclosure. The disclosure relates to a requirement scene for cross-cluster resource access under multiple clusters. In general, a network service instance may be established based on an underlying base cluster architecture of each cluster, and then the network server instance is utilized to manage network communications between resource instances inside the cluster and requesters external to the cluster.

Figure 2:
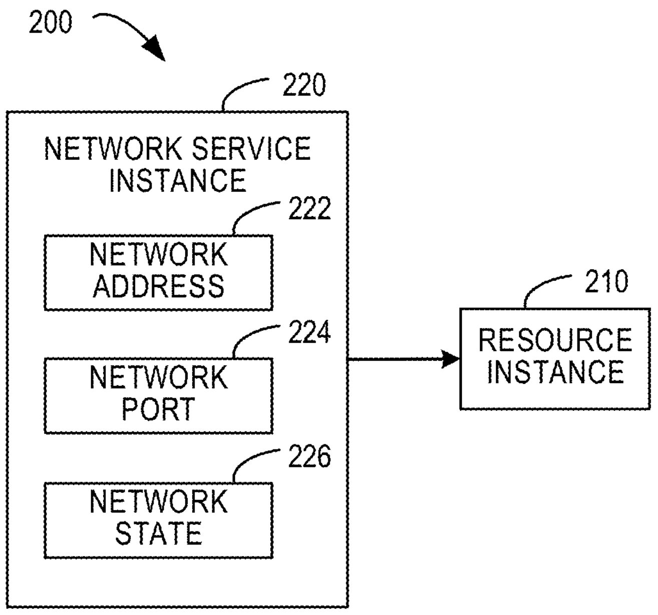
FIG. 2 illustrates a block diagram for performing resource schedule in a cluster according to some implementations of the present disclosure.

Referring to FIG. 2 for a summary according to an example implementation of the present disclosure, here FIG. 2 illustrates a block diagram 200 for performing resource schedule in a cluster according to some implementations of the present disclosure. As shown in FIG. 2, for a resource instance 210 in a certain cluster, a network service instance 220 may be created for managing a network service of the resource instance 210. For example, specific content of the network service may be defined based on a customer resource definition (abbreviated as CRD) function supported by the infrastructure of the cluster (for example, implemented by a class). Further, the network service may be instantiated to generate a network service instance 220.

Network service instance 220 may record a network address 222 and a network port 224 for providing a network service, and a network link is established for accessing resource instance 210 using the network address 222 of resource instance 210 and the network port 224 allocated to resource instance 210. In a situation where the network link has been established, the network state 226 in the network service instance 220 may be updated based on the network link. At this point, it may be determined whether the network link has been successfully established through the network state 226. If it is detected that the network state 226 indicates the network link has been established, the resource instance 210 may be launched to communicate with the launched resource instance via the network link.

With the example implementations of the present disclosure, the network service instance 220 is established only based on the capabilities provided by the underlying base cluster architecture, and the problem of accessing the resource instances in various cluster environments may be solved in a unified manner by means of dedicated functions of any cluster provider. Further, the range of network ports may be flexibly configured, at which point the allocated ports are unique within the node corresponding to the resource instance, but not within the entire cluster. In this way, the provision of the number of available ports may be fully guaranteed. Thus, the proposed implementation is particularly suitable for cross-cluster service mesh management, cross-cluster service registry, and cross-cluster gateway traffic calls, and the like.

Detailed Procedure for Cross-Cluster Resource Access

According to one example implementation of the present disclosure, the present disclosure provides a universal network interworking solution across clusters. For ease of description, Kubernetes is used as only an example of the basic cluster architecture to describe communications between multiple clusters developed based on the Kubernetes architecture. Alternatively and/or in addition, the process of performing resource schedule in a cluster may be implemented based on various cluster architectures that have been currently proposed and/or that will be developed in the future, as long as the underlying cluster architecture supports custom network service instances. Further, the resource instance herein may be, for example, an instance of a Pod resource in a Kubernetes architecture. Here, the Pod is the smallest resource unit in the Kubernetes architecture. The Pod may comprise one or more container, and an individual container in the Pod may share storage and network, and the Pod may have a single network address.

Figure 3:
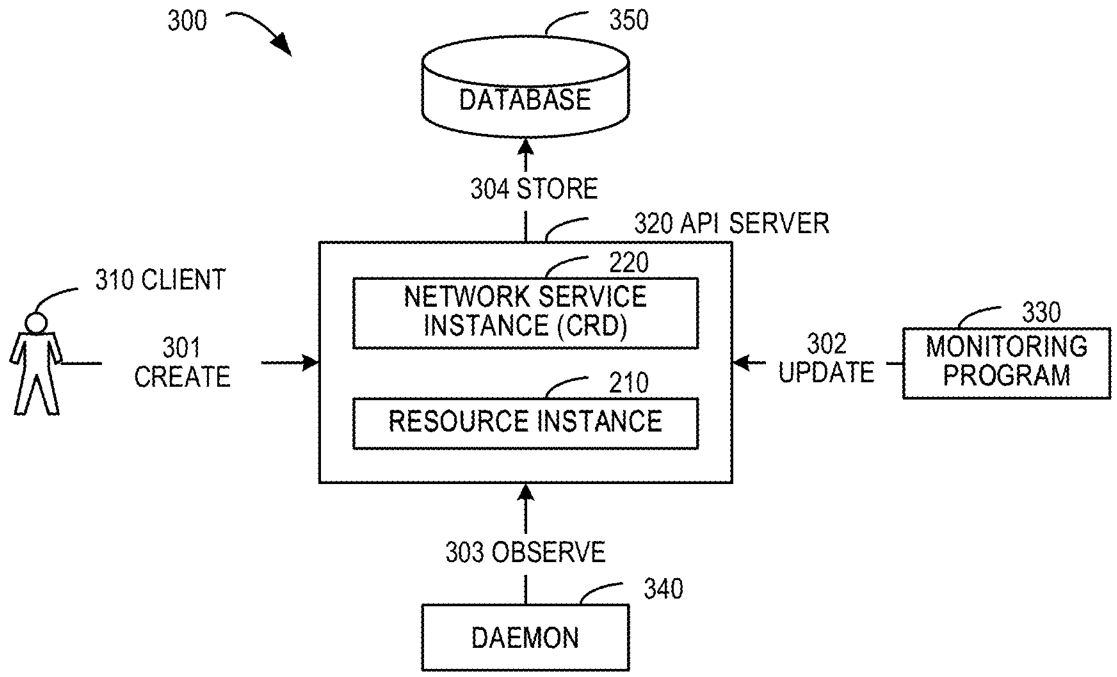
FIG. 3 illustrates a block diagram of performing resource schedule in a cluster based on a network service instance according to some implementations of the present disclosure.

Referring to FIG. 3 for an architecture according to one example implementation of the present disclosure. FIG. 3 illustrates a block diagram 300 of performing resource schedule in a cluster based on a network service instance according to some implementations of the present disclosure. As shown in FIG. 3, the resource instance access may be implemented across clusters based on three core portions: a network service instance 220, a monitoring program 330, and a daemon 340. The client 310 may create a resource instance 210 (e.g., Pod), and may create a corresponding network service instance 220 for the resource instance 210 to manage the network service for the resource instance 210, which may be implemented based on Kubernetes CRD function. Further, monitoring program 330 and daemon 340 may be utilized to complete a particular process for accessing network instance 210.

According to an example implementation of the present disclosure, in a process of creating a network service instance, a network service may be defined by using a customer resource definition function of a cluster. For the Kubernetes architecture, the data structure of the network service may be defined based on the CRD function of Kubernetes. For example, the data structure of the network service may be definition based on the following Table 1.

TABLE 1

Example of Data Structure of Network Service

| Code Segment | Code |
|---|---|
| 1 | type PortMap struct {<br>metav1.TypeMeta ‘json:",inline"‘<br>metav1.ObjectMeta ‘json:"metadata,omitempty"<br>Spec PortMapSpec‘json:"spec,omitempty"‘<br>State PortMapState ‘json:"state,omitempty"‘<br>} |
| 2 | type PortMapSpec struct {<br>// name of service instance<br>PodName string ‘json:"podName"‘<br>// name space of service instance<br>PodNS string ‘json:"podNS"‘<br>// IP of service instance<br>PodIP string ‘json:"podIP"‘<br>// IP of a node where the service instance locates<br>HostIP string ‘json:"hostIP"‘ |

TABLE 1-continued

Example of Data Structure of Network Service

| Code Segment | Code |
|---|---|
| | // container port info of service instance |
| | // use a comma to separate multiple ports (if any), for example: 80,8090 |
| | ServicePorts string ‘json:"servicePorts"‘ 20 |
| | } |
| 3 | type PortMapState struct { |
| | // natPorts info, such as <containerPort>:<allocated port> |
| | // if the service have multiple containerPorts, |
| | // such as: <containerPort1>:< allocated port 1>,<container |
| | // for example: 80:40002,8090:40003 |
| | NatPorts string ‘json:"natPorts"‘ 27 |
| | } |

As shown in code segment 1 in Table 1, a data structure of a network service (e.g., with a specific name of PortMap) may be defined. The network service may comprise type metadata and object metadata. Further, the network service may comprise a network configuration-related data structure (e.g., named PortMapSpec). The code segment 2 shows a specific data structure of the network configuration, for example, may comprise: a name of the service instance "PostName", a name space of the service instance "PostNS", a network address of the service instance "PodIP", a network address of a node where the service instance locates "HostIP", a container port of the service instance "ServicePorts", and the like. Further, the code segment 3 shows a specific data structure related to the network state, for example, a string format may be used to store the network state.

It should be understood that above names of each structure and variable are example. For example, PortMap is merely an example name of a network service, and may come from a name that defines a network service based on a variety of naming ways. For example, another name such as MyNetService may be used to define the network service. The name of the network configuration data "PortMapSpec" is also example, and another name such as MySpec may be used to define the network configuration data.

According to an example implementation of the present disclosure, in a process of defining a network service, a service account configuration of a resource instance may be checked to determine whether the resource instance allows a customer resource definition function. Specifically, the configuration of the pod "ServiceAccount" may be checked to determine whether the Pod has a permission to operate the Portmap CRD. A data structure of the network service may be defined in response to determining that there is a corresponding permission, and the network service instance 220 is obtained by an instantiating operation. In this way, the underlying function of the underlying Kubernetes architecture may be invoked directly without the dedicated function of the provider of each cluster, thereby enabling resource instance access across clusters.

According to an example implementation of the present disclosure, in response to determining that the resource instance does not allow the customer resource definition function, updating the service account configuration to allow the customer resource to define the function. That is, if it is determined that there is no corresponding permission, the ClusterRoleBinding configuration of the Portmap may be updated to ensure that the Pod has the permission to operate the Portmap CRD. In this way, it may be ensured that the Pod is able to operate the network service instance 220 definition in the above manner, thereby managing communications between the resource instance 210 and various requesters external to the cluster by using the network service instance 220.

Still referring to FIG. 3, the process of creating the network service instance 220 may be managed by using the monitoring program 330, and the created communication process may be managed by using the daemon 340. In implementing the monitoring program 330, the monitoring program 330 may be named for example Webhook (or other name), and corresponding code is written to implement the monitoring program 330. Here, Webhook may represent a Kubernetes Muting Admission Webhook, and Webhook may be set in the cluster in the form of Kubernetes deployment resources.

According to an example implementation of the present disclosure, the network service instance 220 may be established only if it is detected that an external access interface needs to be provided to a requester external to the cluster. For example, a network service instance is created in response to detecting an access permission that allows access to a resource instance from a requester external to the cluster. In this way, the various resource consumptions involved in the instantiation process may be reduced and an external access interface is provided only when needed.

Specifically, the network service instance 220 may be created in response to detecting an access permission that allows access to the resource instance from a requester external to the cluster. For example, a network service label for a resource instance may be detected. If it is detected that the network service label is set to active, it may be determined that an access permission is detected. In this way, it is possible to determine whether the network service instance 220 needs to be created in a simple and efficient manner. For example, the following label of the created resource instance 210 may be detected: specific configurations of "pod.kubernetes.io/portmap".

According to one example implementation of the present disclosure, if the label is set to active, i.e., pod.kubernele.io/portmap: enabled, the network service instance 220 may be created. If the label is set to be inactive, i.e., pod.kubernetes.io/portmap: disabled, then no external access is allowed at this time, and thus it is operated in the normal way without creating the network service instance 220.

According to an example implementation of the present disclosure, in the process of creating the network service instance 220, the content of the resource instance 210 may be updated 302 by the monitoring program 330. For example, an initialization container may be injected into the resource instance 210 and an initialization container in the resource instance 210 may be launched to instantiate a network service, thereby creating the network service instance 220. Further details are described with reference to FIG. 4, which illustrates a block diagram 400 of injecting an initialization container into the resource instance 210 according to some implementations of the present disclosure.

Figure 4:
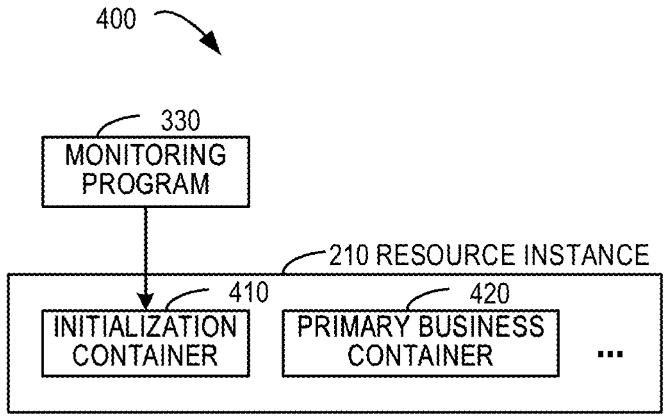
FIG. 4 illustrates a block diagram of injecting an initialization container into a resource instance according to some implementations of the present disclosure.

As shown in FIG. 4, in response to detecting that the pod.kubernele.io/portmap label is active, the monitoring program 330 may inject the initialization container 410 into the resource instance 210. The initialization container 410 acts to create the network service instance 220 defined in the manner shown in the above Table 1. It should be appreciated that the resource instance 210 itself may comprise one or more containers: e.g., a primary business container 420 for executing primary business logic. Alternatively and/or in addition, the resource instance 210 may comprise a business container for executing other business logic. At this point, the initialization container 410 will be inserted before respective business containers and will be first invoked during the launch of the resource instance 210.

Further, the monitoring program 330 may inject the various required environmental variables into the main business container 420, and the monitoring program 330 may add annotations so that each business container may directly use the network service provided by the Portmap. Alternatively and/or in addition, the monitoring program 330 may store the updated resource instances to the database 350 of the cluster. In this way, various requesters inside and/or outside the cluster may be facilitated to obtain required information via the database 350, thereby improving the access efficiency.

Returning to FIG. 3, according to one example implementation of the present disclosure, the daemon 340 may be utilized to manage the created communication process. In implementing the daemon 340, the daemon 340 may be named "Daemon" and corresponding code may be written to implement the daemon 340. Here, the daemon 340 may be implemented based on Kubernetes controller technology and deployed in clusters in the form of daemons of Kubernetes. At this time, the daemon 340 may observe 303 the state of the network service instance 220, and perform Natport allocation through the port configuration algorithm. Meanwhile, a network address table (e.g., IPtables) rule is created to implement NAT mapping of the Pod container port and the Natport port.

According to an example implementation of the present disclosure, in a process of establishing a network link, the daemon 340 may detect a port allocation state of the resource instance 210. Specifically, the change of the Pormap may be observed by the ways of List and/or Watch. Further, the port allocation and release logic may be implemented by updating the bitmap by using a port-based port allocation algorithm.

Further, in response to detecting that the port allocation state indicates the network port has been allocated to the resource instance 210, the address table of the cluster may be set so as to create a network link associated with the network port and the network address. Specifically, after a port has been allocated to the resource instance 210, the daemon 340 may establish a corresponding network link by modifying a network address table in the cluster. IPtables may be used in a user space command line program for configuring a data packet filtering rule set in Linux, and details are not described herein again.

It should be understood that multiple network links may be supported in the Kubernetes architecture, and in the context of the present disclosure, three types of network links may be set to support cross-cluster communication: PREROUTING link, OUTPUT link, and POSTROUTING link.

Hereinafter, details about how to modify the network address table will be described, thereby starting the above various links. According to one example implementation of the present disclosure, the pre-routing link will apply rules in this link before routing the data packet. External Pod access is achieved through DNAT rules. For example, the pre-routing link may be set based on the manner shown in Table 2.

TABLE 2

| Link Startup Mode |
|---|
| 1 -t nat -A PREROUTING -d < IP of the node where Pod locates> - p < protocol type > -<br>dport < nationPort > - j D |

According to an example implementation of the present disclosure, when the firewall itself sends the data packet, the rule in the output link is applied. In this case, the output link may access the local Node where the Pod locates through the DNAT rule. For example, the output link may be set based on the manner shown in Table 3.

TABLE 3

| Link Startup Mode |
|---|
| 1 -t nat -A OUTPUT -d < IP of the node where Pod locates > -p < protocol type > --dport<br><natPort> -j DNAT |

According to an example implementation of the present disclosure, after routing the data packet, the rule in the post-routing link may be applied. In this case, the post-routing link may implement access to the Pod by using the SNAT rule. For example, the post-routing link may be set based on the manner shown in Table 4.

TABLE 4

| Link Setup |
|---|
| 1 -t nat -A POSTROUTING -s <Pod IP> -d <Pod IP> -j SNAT --to-source <Pod> |

According to one example implementation of the present disclosure, after various operations related to network configuration have been completed, the initialization container may be exited. In this case, the resource instance access may be implemented across clusters by using the rule in the corresponding link. Specifically, after exiting the initialization container, the primary business container in the resource instance 210 may be started. Further, communication may be made between the primary business container and a requester external to the cluster via the network link. With example implementations of the present disclosure, rather than relying on dedicated functions of individual clusters, the resource instance access between clusters established by different providers may be managed in a unified manner based on the IPtables configuration capabilities of the underlying Kubernetes architecture of the respective clusters.

According to an example implementation of the present disclosure, the network state may be written into the configuration information of the resource instance, so that the resource instance obtains the network state by using the configuration information. According to an example implementation of the present disclosure, the network state is written into the annotation of the resource instance, so that the requester external to the resource instance obtains the network state. According to example implementations of the present disclosure, by storing the redundant network state information at different locations in the cluster, different requesters may conveniently obtain the network state in a most convenient manner according to their own access capabilities, thereby achieving future the potential cross-cluster access capability.

Figure 5:
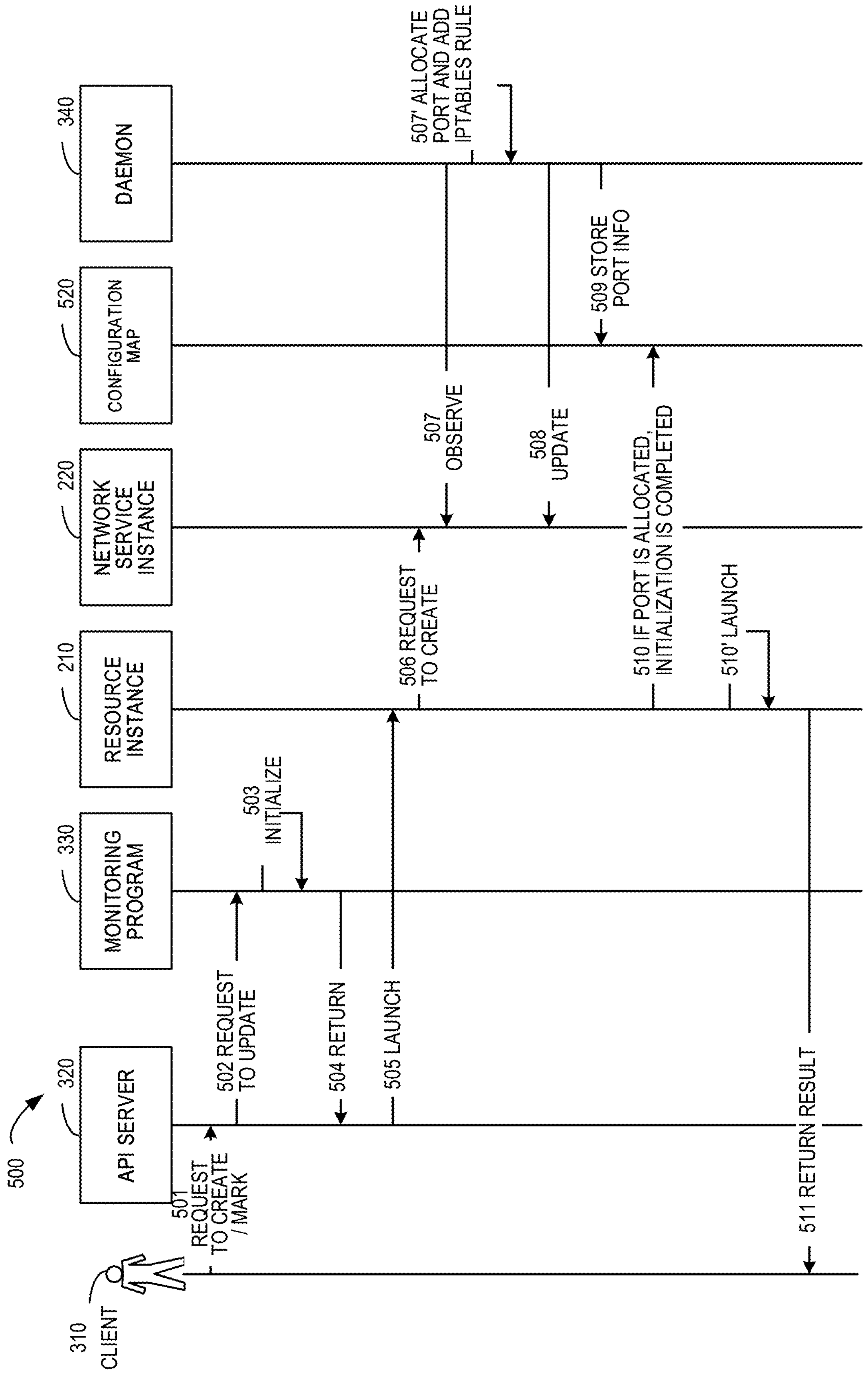
FIG. 5 illustrates a block diagram for establishing a resource instance and launching an access resource instance according to some implementations of the present disclosure.

The above paragraphs have described details of various steps of activating the cross-cluster access capability based on the network service instance 220 separately. Hereinafter, referring to FIG. 5, an overall process of activating the cross-cluster access capability is described, and FIG. 5 shows a block diagram 500 for establishing a resource instance and launching an access resource instance according to some implementations of the present disclosure. As shown in FIG. 5, the client 310 may request 501 to create a resource instance and mark the label: pod.kubernele.io/portmap: enabled for a resource instance that desires to achieve cross-cluster access. It may be determined whether the label is activated, and if the label is activated, the execution may be continued. In the context of the present disclosure, the specific process of marking the label is not limited. For example, the label may be manually set by an administrator at the client 310, or the label may be set by other management tools in the cluster called by the client 310.

Further, the API server 320 may request to update 502 the created resource instance. The monitoring program 330 may check whether the ServiceAccount of the resource instance has the permission to operate the Portmap CRD. If it does not have the permission, the Portmap ClusterRoleBinding configuration may be updated to ensure that the Pod has the permission to operate the Portmap CRD. Then, the monitoring program 330 may inject an initialization procedure into the resource instance and add necessary environmental variables and annotations, and the like, so as to perform the initialization 503. According to an example implementation of the present disclosure, the updated resource instance may be stored in a database, and the updated resource instance may be returned 504.

Further, a resource instance may be launched 505, that is, the resource instance 210 enters the running stage. An initialization container may first be launched and request to create 506 the network service instance 220. The daemon 340 may constantly observe 507 (e.g., by the ways of list and/or watch) the port allocation state of the Natport of the resource instance 210. Daemon 340 may allocate 507' the Natport and add rules of IPtables, and update 508 the various information in network service instance 220 accordingly.

Specifically, the Natport information may be updated into the annotation of the resource instance 210 to facilitate the use of the Natport. If it is detected that the port allocation is successful, the initialization container may be exited 510 and the primary business container in the resource instance 210 may be launched 510'. At this time, the network link has been established through the resource instance 210, so the resource instance 210 may return 511 the result to the client 310. At this point, the communication may be made between the primary business container of the resource instance 210 and the requester external to the cluster via the already established network link.

According to one example implementation of the present disclosure, in the situation where the cross-cluster access is required, the lifecycle of network service instance 220 follows the resource instance 210. The created network service instance 220 described with reference to FIG. 5 will be automatically deleted as the resource instance 210 is destroyed. Specifically, if the resource instance 210 is detected to be destroyed, the network service instance 220 needs to be removed, the allocated network port is released, and the communication link is deleted.

Figure 6:
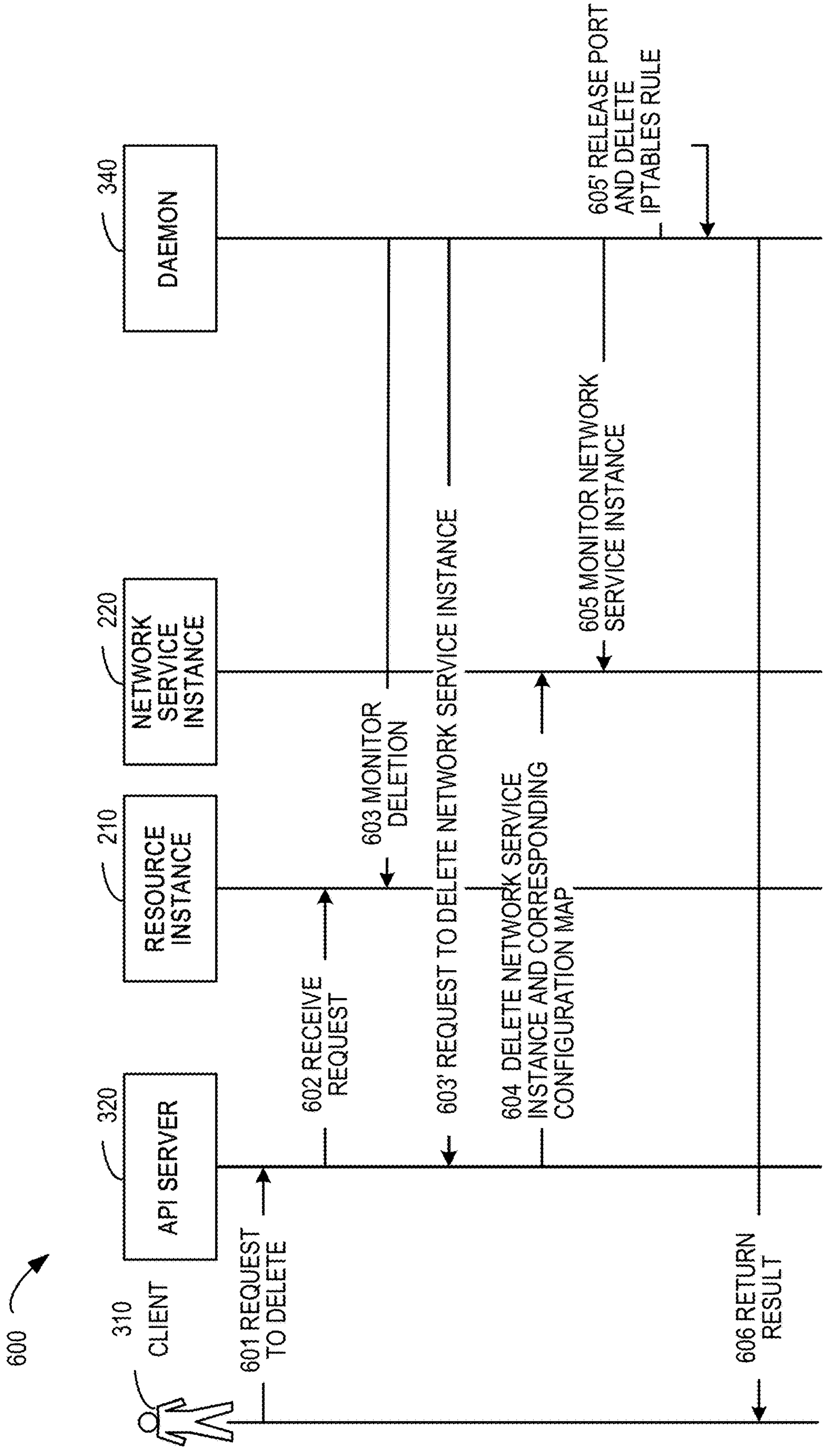
FIG. 6 illustrates a block diagram for destroying a resource instance according to some implementations of the present disclosure.

The destruction process is an inverse process of the creation process, referring to FIG. 6 for more details, and FIG. 6 shows a block diagram 600 for destroying a resource instance according to some implementations of the present disclosure. As shown in FIG. 6, the client 310 may request 601 to delete the created resource instance 210. At this point, the API server 320 receives 602 the request and informs the resource instance 210 of the deletion process.

The daemon 340 may monitor 603 the deletion process and request 603 the API server 320 to delete the network service instance 220. The API server 320 may perform 604 the delete operation. At this point, the previously created network service instance 220 may be automatically deleted and the associated configuration map is performed for cascading deletion. The daemon 340 may monitor 605 the delete operation of the network service instance 220. In response to detecting the delete operation, the port allocated before may be automatically released 605', and the set IPtables rule may be cleaned. At this point, the deletion process ends and daemon 340 may return 606 the result to client 310.

With example implementations of the present disclosure, during performing the cross-cluster access by using the network service instance, creating and deleting the network service instance relies solely on the various capabilities in the base cluster architecture but not the dedicated capabilities other than the base cluster architecture, which are separately developed by the providers of the respective clusters.

The cross-cluster access solution according to one example implementation of the present disclosure does not depend on the dedicated capabilities within any particular cluster, and thus is general and suitable for managing resource instance access across multiple clusters in a unified manner. Further, through an efficient port management algorithm, the ports may be automatically allocated and released, thereby avoiding various overheads of port management and the like. In addition, the allocatable port range may be flexibly configured to provide sufficient network ports for the cross-cluster access in case of large-scale data access.

Example Processes

Figure 7:
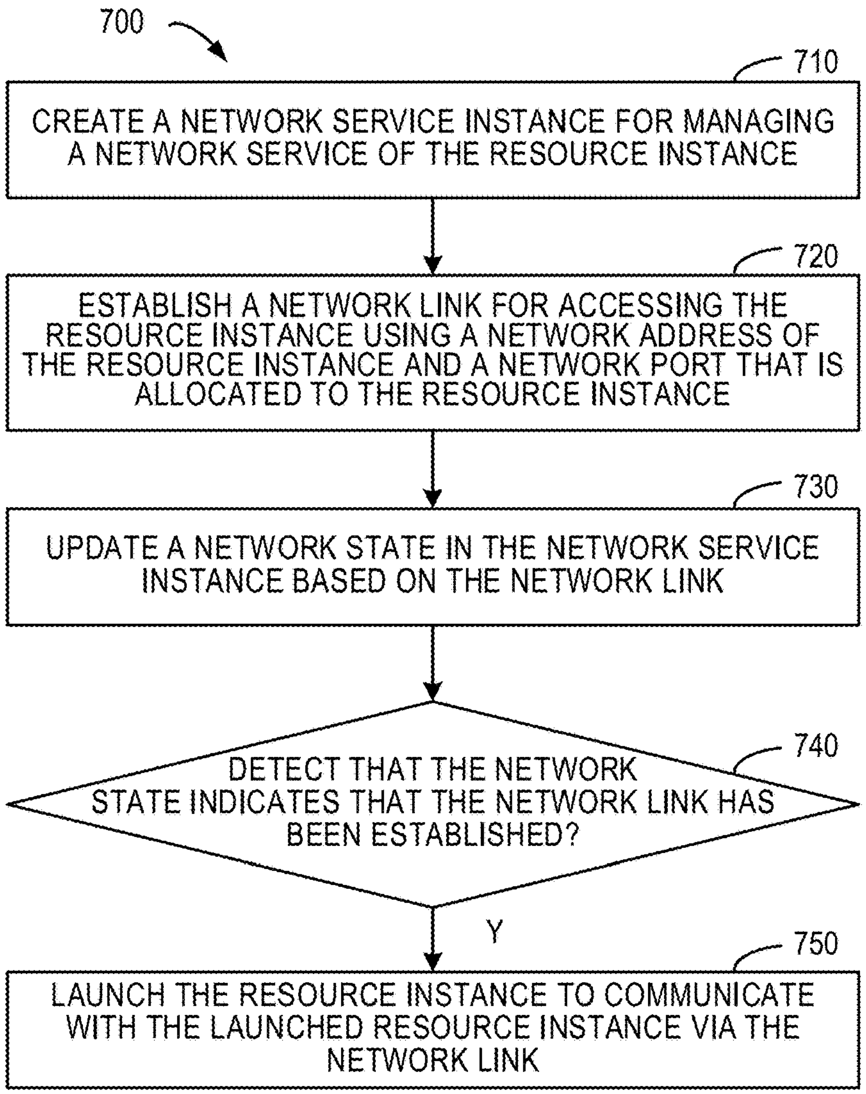
FIG. 7 illustrates a flowchart of a method for performing resource schedule in a cluster according to some implementations of the present disclosure.

FIG. 7 shows a flowchart of a method 700 for performing resource schedule in a cluster according to some implementations of the present disclosure. At a block 710, a network service instance is created for managing a network service of the resource instance. At a block 720, a network link is established for accessing the resource instance using a network address of the resource instance and a network port that is allocated to the resource instance. At a block 730, a network state in the network service instance is updated based on the network link. At a block 740, it is detected that the network state indicates that the network link has been established. At a block 750, the resource instance is launched to communicate with the launched resource instance via the network link.

According to one example implementation of the present disclosure, creating the network service instance comprises:

in response to detecting an access permission to allow access to the resource instance from a requester external to the cluster, creating the network service instance.

According to one example implementation of the present disclosure, detecting the access permission comprises: detecting a network service label of the resource instance; and in response to detecting that the network service label is set to active, determining that the access permission is detected.

According to one example implementation of the present disclosure, creating the network service instance comprises: defining the network service using a customer resource definition function of the cluster; injecting an initialization container into the resource instance; and creating the network service instance by launching the initialization container in the resource instance to instantiate the network service.

According to one example implementation of the present disclosure, defining the network service comprises: determining whether the resource instance allows the customer resource definition function based on a service account configuration of the resource instance; and in response to determining that the resource instance allows the customer resource definition function, defining the network service.

According to one example implementation of the present disclosure, the method 700 further comprises: in response to determining that the resource instance does not allow the customer resource definition function, updating the service account configuration to allow the customer resource definition function.

According to one example implementation of the present disclosure, the method 700 further comprises: injecting an environment variable configuration into a primary business container of the resource instance; and storing the updated resource instance to a database of the cluster.

According to one example implementation of the present disclosure, launching the resource instance comprises: exiting the initialization container; and launching the primary business container in the resource instance.

According to one example implementation of the present disclosure, the method 700 further comprises: performing communication between the primary business container and a requester external to the cluster via the network link.

According to one example implementation of the present disclosure, establishing the network link comprises: detecting a port allocation state of the resource instance; and in response to detecting that the port allocation state indicates that the network port has been allocated to the resource instance, creating the network link associated with the network port and the network address by setting an address table of the cluster.

According to one example implementation of the present disclosure, the method 700 further comprises at least any of: writing the network state into configuration information of the resource instance, so that the resource instance obtains the network state through the configuration information; and writing the network state into an annotation of the resource instance, so that a requester external to the resource instance obtains the network state.

According to one example implementation of the present disclosure, the method 700 further comprises: in response to detecting that the resource instance is destroyed, removing the network service instance; releasing the network port; and deleting the network link.

According to one example implementation of the present disclosure, the network link comprises at least any of: a pre-route link, an output link, and a post-route link.

According to one example implementation of the present disclosure, the cluster is implemented based on a Kubernetes architecture, and the resource instance is an instance of a Pod resource in the cluster.

Example Apparatus and Device

Figure 8:
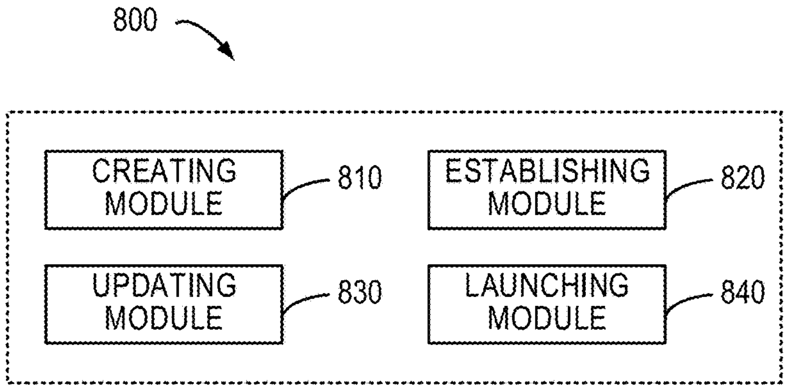
FIG. 8 illustrates a block diagram of an apparatus for performing resource schedule in a cluster according to some implementations of the present disclosure.

FIG. 8 shows a block diagram of an apparatus 800 for performing resource schedule in a cluster according to some implementations of the present disclosure. As shown in FIG. 8, the apparatus 800 comprises: a creating module 810, configured for creating a network service instance for managing a network service of the resource instance; an establishing module 820, configured for establishing a network link for accessing the resource instance using a network address of the resource instance and a network port that is allocated to the resource instance; an updating module 830, configured for updating a network state in the network service instance based on the network link; and a launching module 840, configured for launching, in response to detecting that the network state indicates that the network link has been established, the resource instance to communicate with the launched resource instance via the network link.

According to one example implementation of the present disclosure, the creating module 810 comprises: a detecting module, configured for detecting whether there is an access permission to allow access to the resource instance from a requester external to the cluster; and a detection-based creating module, configured for creating, in response to detecting an access permission to allow access to the resource instance from a requester external to the cluster, the network service instance.

According to one example implementation of the present disclosure, the detecting module comprises: a label detecting module, configured for detecting a network service label of the resource instance; and a label-based detecting module, configured for determining, in response to detecting that the network service label is set to active, that the access permission is detected.

According to one example implementation of the present disclosure, the creating module 810 comprises: a defining module, configured for defining the network service using a customer resource definition function of the cluster; an injecting module, configured for injecting an initialization container into the resource instance; and an instantiating module, configured for creating the network service instance by launching the initialization container in the resource instance to instantiate the network service.

According to one example implementation of the present disclosure, the defining module comprises: a function determining module, configured for determining whether the resource instance allows the customer resource definition function based on a service account configuration of the resource instance; and a function-based determining module, configured for defining, in response to determining that the resource instance allows the customer resource definition function, the network service.

According to one example implementation of the present disclosure, the apparatus 800 further comprises: an updating module, configured for updating, in response to determining that the resource instance does not allow the customer resource definition function, the service account configuration to allow the customer resource definition function.

According to one example implementation of the present disclosure, the apparatus 800 further comprises: a variable injecting module, configured for injecting an environment variable configuration into a primary business container of the resource instance; and a storing module, configured for storing the updated resource instance to a database of the cluster.

According to one example implementation of the present disclosure, the launching module comprises: an initialization exiting module, configured for exiting the initialization container; and a primary business launching module, configured for launching the primary business container in the resource instance.

According to one example implementation of the present disclosure, the apparatus 800 further comprises: a communication module, configured for performing communication between the primary business container and a requester external to the cluster via the network link.

According to one example implementation of the present disclosure, the establishing module comprises: a port state detecting module, configured for detecting a port allocation state of the resource instance; and a setting module, configured for creating, in response to detecting that the port allocation state indicates that the network port has been allocated to the resource instance, the network link associated with the network port and the network address by setting an address table of the cluster.

According to one example implementation of the present disclosure, the apparatus 800 further comprises at least any of: a first writing module, configured for writing the network state into configuration information of the resource instance, so that the resource instance obtains the network state through the configuration information; and a second writing module, configured for writing the network state into an annotation of the resource instance, so that a requester external to the resource instance obtains the network state.

According to one example implementation of the present disclosure, the apparatus 800 further comprises: a removing module, configured for removing, in response to detecting that the resource instance is destroyed, the network service instance; a releasing module, configured for releasing the network port; and a deleting module, configured for deleting the network link.

According to one example implementation of the present disclosure, the network link comprises at least any of: a pre-route link, an output link, and a post-route link.

According to one example implementation of the present disclosure, the cluster is implemented based on a Kubernetes architecture, and the resource instance is an instance of a Pod resource in the cluster.

Figure 9:
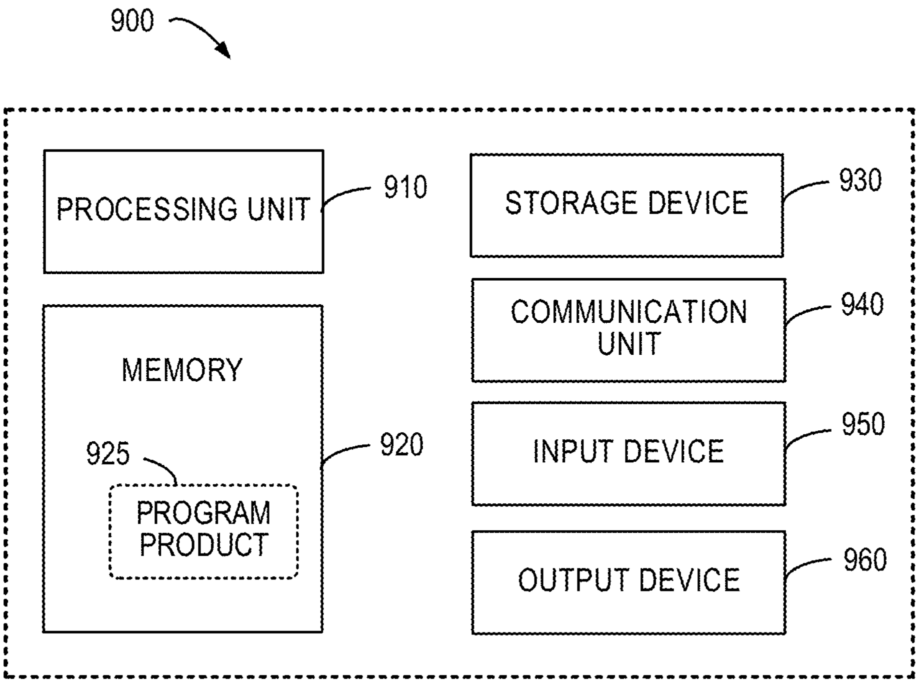
FIG. 9 illustrates a block diagram of a device capable of implementing various implementations of the present disclosure.

FIG. 9 illustrates a block diagram of a device 900 that can implement a plurality of implementations of the present disclosure. It should be understood that the computing device 900 shown in FIG. 9 is only exemplary and shall not constitute any limitation on the functions and scope of the implementations described herein. The computing device 900 shown in FIG. 9 can be used to implement the method described above.

As shown in FIG. 9, the computing device 900 is in the form of a general purpose computing device. Components of the computing device 900 may include, but are not limited to, one or more processors or processing units 910, a memory 920, a storage device 930, one or more communication units 940, one or more input devices 950, and one or more output devices 960. The processing unit 910 may be a physical or virtual processor and may execute various processing based on the programs stored in the memory 920. In a multi-processor system, a plurality of processing units executes computer-executable instructions in parallel to enhance parallel processing capability of the computing device 900.

The computing device 900 usually includes a plurality of computer storage mediums. Such mediums may be any attainable medium accessible by the computing device 900, including but not limited to, a volatile and non-volatile medium, a removable and non-removable medium. The memory 920 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash), or any combination thereof. The storage device 930 may be a removable or non-removable medium, and may include a machine-readable medium (e.g., a memory, a flash drive, a magnetic disk) or any other medium, which may be used for storing information and/or data (e.g., training data for training) and be accessed within the computing device 900.

The computing device 900 may further include additional removable/non-removable, volatile/non-volatile storage mediums. Although not shown in FIG. 10, there may be provided a disk drive for reading from or writing into a removable and non-volatile disk (e.g., "floppy disk") and an optical disc drive for reading from or writing into a removable and non-volatile optical disc. In such cases, each drive may be connected to a bus (not shown) via one or more data medium interfaces. The memory 920 may include a computer program product 925 having one or more program modules, and these program modules are configured for performing various methods or acts of various implementations of the present disclosure.

The communication unit 940 implements communication with another computing device via a communication medium. Additionally, functions of components of the computing device 900 may be realized by a single computing cluster or a plurality of computing machines, and these computing machines may communicate through communication connections. Therefore, the computing device 900 may operate in a networked environment using a logic connection to one or more other servers, a Personal Computer (PC) or a further general network node.

The input device 950 may be one or more various input devices, such as a mouse, a keyboard, a trackball, a voice-input device, and the like. The output device 960 may be one or more output devices, e.g., a display, a loudspeaker, a printer, and so on. The computing device 900 may also communicate through the communication unit 940 with one or more external devices (not shown) as required, where the external device, e.g., a storage device, a display device, and so on, communicates with one or more devices that enable users to interact with the computing device 900, or with any device (such as a network card, a modem, and the like) that enable the computing device 900 to communicate with one or more other computing devices. Such communication may be executed via an Input/Output (I/O) interface (not shown).

According to the example implementations of the present disclosure, a computer-readable storage medium is provided, on which computer-executable instructions are stored, wherein the computer-executable instructions are executed by a processor to implement the method described above. According to the example implementations of the present disclosure, a computer program product is further provided, which is tangibly stored on a non-transient computer-readable medium and includes computer-executable instructions, which are executed by a processor to implement the method described above. According to the example implementations of the present disclosure, a computer program product is provided, storing a computer program thereon, the program, when executed by a processor, implementing the method described above.

Aspects of the present disclosure are described herein with reference to flowchart illustrations and/or block diagrams of methods, apparatus, devices and computer program products according to implementations of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present disclosure have been presented for purposes of illustration, but are not intended to be exhaustive or limited to implementations disclosed. Many modifications and variations will be apparent to those of ordinary skill in the art without departing from the scope and spirit of the described implementations. The terminology used herein was chosen to best explain the principles of implementations, the practical application or technical improvement over technologies found in the marketplace, or to enable others of ordinary skill in the art to understand implementations disclosed herein.

The invention claimed is:

1. A method for performing resource schedule in a cluster, comprises:

creating, based on a customer resource definition function of the cluster, a network service instance for managing a network service of a resource instance, the resource instance being within the cluster, and a lifecycle of the network service instance following the resource instance;

establishing a network link for accessing the resource instance using a network address of the resource instance and a network port that is allocated to the resource instance;

updating a network state in the network service instance based on the network link;

in response to detecting that the network state indicates that the network link has been established, launching the resource instance; and communicating with the launched resource instance via the network link.

2. The method of claim 1, wherein creating the network service instance comprises: in response to detecting an access permission to allow access to the resource instance from a requester external to the cluster, creating the network service instance.

3. The method of claim 2, wherein detecting the access permission comprises:

detecting a network service label of the resource instance; and in response to detecting that the network service label is set to active, determining that the access permission is detected.

4. The method of claim 1, wherein creating the network service instance comprises:

defining the network service using the customer resource definition function of the cluster;

injecting an initialization container into the resource instance; and creating the network service instance by launching the initialization container in the resource instance to instantiate the network service.

5. The method of claim 4, wherein defining the network service comprises:

determining whether the resource instance allows the customer resource definition function based on a service account configuration of the resource instance; and in response to determining that the resource instance allows the customer resource definition function, defining the network service.

6. The method of claim 5, further comprising: in response to determining that the resource instance does not allow the customer resource definition function, updating the service account configuration to allow the customer resource definition function.

7. The method of claim 4, further comprising:

injecting an environment variable configuration into a primary business container of the resource instance; and storing the updated resource instance to a database of the cluster.

8. The method of claim 7, wherein launching the resource instance comprises:

exiting the initialization container; and launching the primary business container in the resource instance.

9. The method of claim 8, further comprising: performing communication between the primary business container and a requester external to the cluster via the network link.

10. The method of claim 1, wherein establishing the network link comprises:

detecting a port allocation state of the resource instance; and in response to detecting that the port allocation state indicates that the network port has been allocated to the resource instance, creating the network link associated with the network port and the network address by setting an address table of the cluster.

11. The method of claim 1, further comprising at least any of:

writing the network state into configuration information of the resource instance, so that the resource instance obtains the network state through the configuration information; and writing the network state into an annotation of the resource instance, so that a requester external to the resource instance obtains the network state.

12. The method of claim 1, further comprising: in response to detecting that the resource instance is destroyed, removing the network service instance;

releasing the network port; and deleting the network link.

13. The method of claim 1, wherein the network link comprises at least any of: a pre-route link, an output link, and a post-route link.

14. The method of claim 1, wherein the cluster is implemented based on a Kubernetes architecture, and the resource instance is an instance of a Pod resource in the cluster.

15. An electronic device, comprises:

at least one processing unit; and at least one memory coupled to the at least one processing unit and storing instructions executed by the at least one processing unit, the instructions, when executed by the at least one processing unit, causing the electronic device to perform a method for performing resource schedule in a cluster, the method comprising:

creating, based on a customer resource definition function of the cluster, a network service instance for managing a network service of a resource instance, the resource instance being within the cluster, and a lifecycle of the network service instance following the resource instance;

establishing a network link for accessing the resource instance using a network address of the resource instance and a network port that is allocated to the resource instance;

updating a network state in the network service instance based on the network link;

in response to detecting that the network state indicates that the network link has been established, launching the resource instance; and communicating with the launched resource instance via the network link.

16. The device of claim 15, wherein creating the network service instance comprises: in response to detecting an access permission to allow access to the resource instance from a requester external to the cluster, creating the network service instance.

17. The device of claim 16, wherein detecting the access permission comprises:

detecting a network service label of the resource instance; and in response to detecting that the network service label is set to active, determining that the access permission is detected.

18. The device of claim 15, wherein creating the network service instance comprises:

defining the network service using a customer resource definition function of the cluster;

injecting an initialization container into the resource instance; and creating the network service instance by launching the initialization container in the resource instance to instantiate the network service.

19. The device of claim 18, wherein defining the network service comprises:

determining whether the resource instance allows the customer resource definition function based on a service account configuration of the resource instance; and in response to determining that the resource instance allows the customer resource definition function, defining the network service.

20. A non-transitory computer-readable storage medium, storing a computer program thereon, the computer program, when executed by a processor, causing the processor to implement a method for performing resource schedule in a cluster, the method comprising:

creating, based on a customer resource definition function of the cluster, a network service instance for managing a network service of a resource instance, the resource instance being within the cluster, and a lifecycle of the network service instance following the resource instance;

establishing a network link for accessing the resource instance using a network address of the resource instance and a network port that is allocated to the resource instance;

updating a network state in the network service instance based on the network link;

in response to detecting that the network state indicates that the network link has been established, launching the resource instance; and communicating with the launched resource instance via the network link.

* * * * *